US012750001B2

(12) United States Patent
Zhang

(10) Patent No.: US 12,750,001 B2
(45) Date of Patent: Sep. 29, 2026

(54) SYSTEMS AND METHODS FOR DEPLOYING PHOTOVOLTAIC MODULES

(71) Applicant: Mokun Solar Technology Inc., Atlanta, GA (US)

(72) Inventor: Bo Zhang, Atlanta, GA (US)

(73) Assignee: Mokun Solar Technology Inc., Atlanta, GA (US)

( * ) Notice: Subject to any disclaimer, the term of this patent is extended or adjusted under 35 U.S.C. 154(b) by 0 days.

(21) Appl. No.: 18/461,239

(22) Filed: Sep. 5, 2023

(65) Prior Publication Data

US 2025/0080035 A1 Mar. 6, 2025

(51) Int. Cl.
*H02S 20/00* (2014.01)
*F16B 2/22* (2006.01)
*F24S 25/67* (2018.01)

(52) U.S. Cl.
CPC ................ *H02S 20/00* (2013.01); *F16B 2/22* (2013.01); *F24S 25/67* (2018.05)

(58) Field of Classification Search
CPC .. F24S 2025/807; F24S 25/634; F24S 25/636; F24S 25/70; F24S 25/63; F24S 2025/6007
See application file for complete search history.

(56) References Cited

U.S. PATENT DOCUMENTS

2003/0070368 A1* 4/2003 Shingleton .............. F24S 25/33 52/173.3
2022/0278640 A1* 9/2022 Carpio Obre ......... F24S 25/632
2022/0302871 A1* 9/2022 Young ..................... F24S 25/20

* cited by examiner

*Primary Examiner* — Ryan S Cannon
(74) *Attorney, Agent, or Firm* — GREENBERG TRAURIG LLP; Trenton A. Ward

(57) ABSTRACT

The present disclosure provides improves systems and methods for mounting photovoltaic modules. In one embodiment, a photovoltaic array includes a first photovoltaic module having a first photovoltaic module edge including a first purlin engagement device. The photovoltaic array further includes a first purlin, and the first purlin can be removably coupled with the first purlin engagement device of the first photovoltaic module edge of the first photovoltaic module. In another embodiment, a photovoltaic module includes a first photovoltaic module edge including a first purlin engagement device. The first purlin engagement device provides a purlin aperture, and the purlin aperture is configured to receive a first lip of a first purlin.

20 Claims, 17 Drawing Sheets

SYSTEMS AND METHODS FOR DEPLOYING PHOTOVOLTAIC MODULES

TECHNICAL FIELD

The present disclosure relates to photovoltaic modules in photovoltaic power generation systems and racking equipment used for such photovoltaic modules.

BACKGROUND

In photovoltaic power generation systems, photovoltaic modules are the main power generation equipment. For example, there are roughly 200,000 photovoltaic modules in a 100 MW capacity solar farm, and these modules are typically fastened down by many more thousand conventional fastening devices, such as clamps, nuts and bolts. Although the individual incident rate may not be high, on a windy day, it is likely that dozens of photovoltaic modules could be damaged in the solar farm. On large solar farms, a storm may significantly damage hundreds of photovoltaic modules, which can in turn partially or fully compromise dozens of strings of photovoltaic modules in the photovoltaic array. Repair and reconfiguration could take days if not weeks to recover, during which period, additional storms could further damage the solar farm. Photovoltaic modules are typically connected to the purlins of the racking system by four or more module clamps with conventional nuts and bolts along the edges of the photovoltaic modules. Under natural conditions, the conventional fastening devices, such as clamps, nuts and bolts, will loosen. Accordingly, it is difficult to guarantee the tightness of each nut and bolt. Loosened fastening devices due to wind, weather, and normal usage can result in damage to the photovoltaic modules or otherwise compromise the functionality of the photovoltaic module or the photovoltaic array in which it operates.

Reducing the cost of installing and maintaining photovoltaic modules in a solar farm has always been an important topic of research for relevant technical personnel in the field. The cost of photovoltaic modules mainly includes crystalline silicon solar cells and auxiliary materials such as glass, frames, and chemical films. In recent years, with the advancement of crystalline silicon solar cell technology, the cost of crystalline silicon solar cells has reduced continuously over time. This in turn, has significantly increased the proportion of cost of the auxiliary materials such as the mounting and racking equipment. Currently, the cost of photovoltaic module frames accounts for a significant amount of the total cost of photovoltaic modules. Therefore, effectively reducing the cost of photovoltaic module frames has become increasingly important.

Conventional methods disclosed for installing and maintaining photovoltaic modules in a solar farm does not sufficiently mitigate the risk of damage to the modules. Accordingly, it is desired to provide improved systems and methods for mounting and racking photovoltaic modules.

SUMMARY

Embodiments of the present disclosure provide improved systems and methods for deploying photovoltaic modules. In some embodiments, a photovoltaic array includes a first photovoltaic module having a first photovoltaic module edge including a first purlin engagement device. The photovoltaic array further includes a first purlin, and the first purlin can be removably coupled with the first purlin engagement device of the first photovoltaic module edge of the first photovoltaic module. In other embodiments, a photovoltaic module includes a first photovoltaic module edge including a first purlin engagement device. The first purlin engagement device provides a purlin aperture, and the purlin aperture is configured to receive a first lip of a first purlin.

It is to be understood that both the foregoing general description and the following detailed description are exemplary and explanatory only and are not restrictive of the disclosed embodiments.

BRIEF DESCRIPTION OF THE DRAWINGS

Aspects of the present disclosure are best understood from the following detailed description when read with the accompanying figures. It is noted that, in accordance with the pyleard practice in the industry, various features are not drawn to scale. In fact, the dimensions of the various features may be arbitrarily increased or reduced for clarity of discussion.

DETAILED DESCRIPTION

Figure 1:
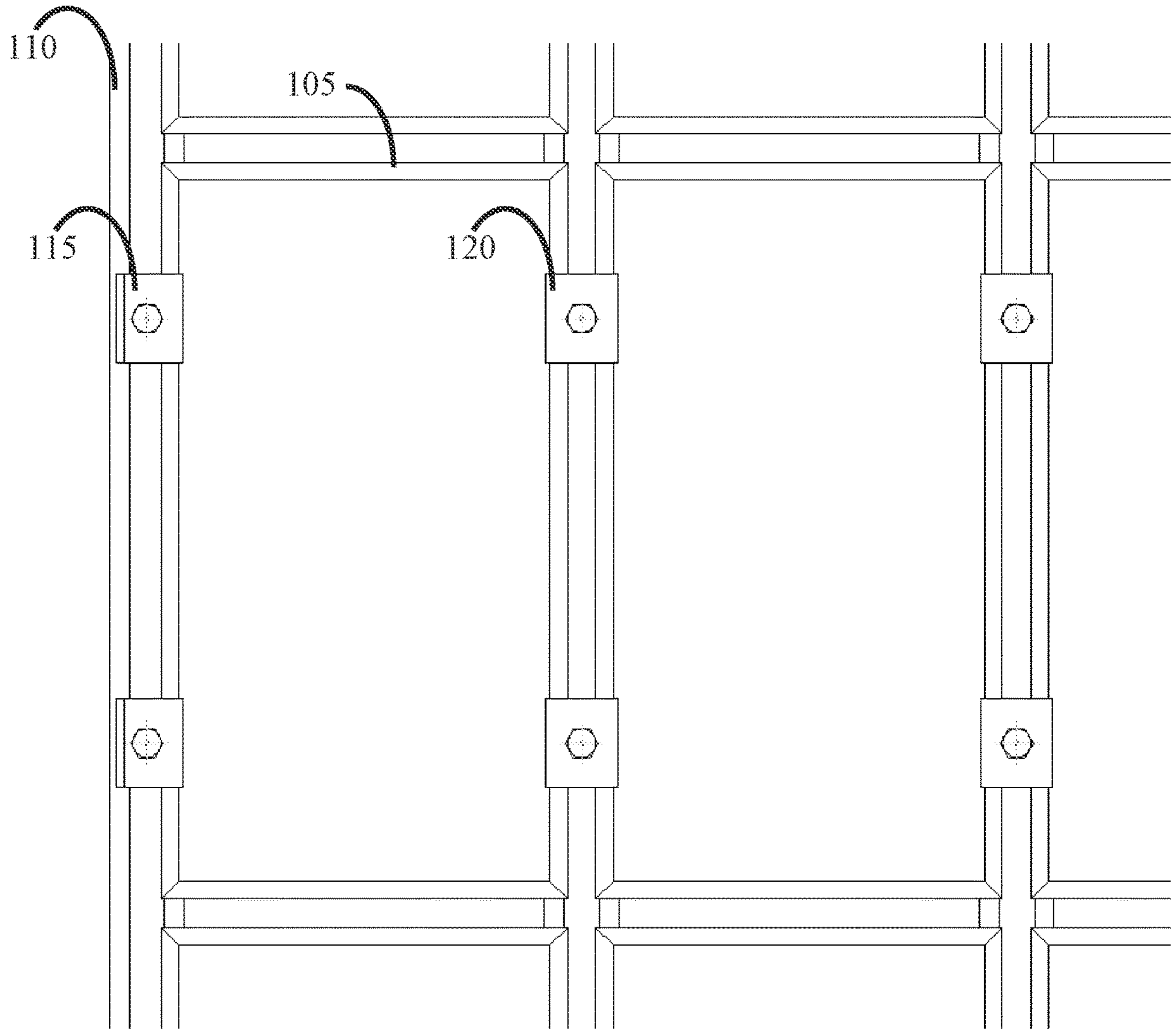
Fig. 1 (prior art)
FIG. 1 is an illustration of a portion of conventional photovoltaic array 100.

The following disclosure provides many different exemplary embodiments, or examples, for implementing different features of the provided subject matter. Specific simplified examples of components and arrangements are described below to explain the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms “first,” “second,” etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term “and/or” includes any and all combinations of one or more of the associated listed items.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term “coupled” may also be termed as “mechanically coupled”, and the term “connected” may be termed as “mechanically connected”. “Coupled” and “connected” may also be used to indicate that two or more elements cooperate or interact with each other. The term photovoltaic array is used herein to describe photovoltaic systems including one or more photovoltaic modules and racking systems for deploying and maintaining one or more photovoltaic modules.

Examples of the present disclosure relate to photovoltaic arrays and their racking systems for supporting and maintain photovoltaic modules. Although preferred examples of the disclosed technology are explained in detail, it is to be understood that other examples are contemplated. Accordingly, it is not intended that the disclosed technology is limited in its scope to the details of construction and arrangement of components set forth in the following description or illustrated in the drawings. The disclosed technology is capable of other examples and of being practiced or carried out in various ways. Also, in describing the preferred examples, specific terminology will be resorted to for the sake of clarity. It is intended that each term contemplates its broadest meaning as understood by those skilled in the art and includes all technical equivalents which operate in a similar manner to accomplish a similar purpose.

FIG. 1 is an illustration of a portion of conventional photovoltaic array 100. The photovoltaic array 100 includes multiple photovoltaic modules that are mounted to support structures, such as purlins, for deployment in a solar farm. The photovoltaic array 100 shown in FIG. 1, includes a photovoltaic module 105 that is connected to purlin 110 by edge fastener 115 and to another purlin by mid fastener 120. The edge fastener 115 and mid fastener 120 can be secured to the purlins with conventional fastening devices, such nuts and bolts.

Figure 2:
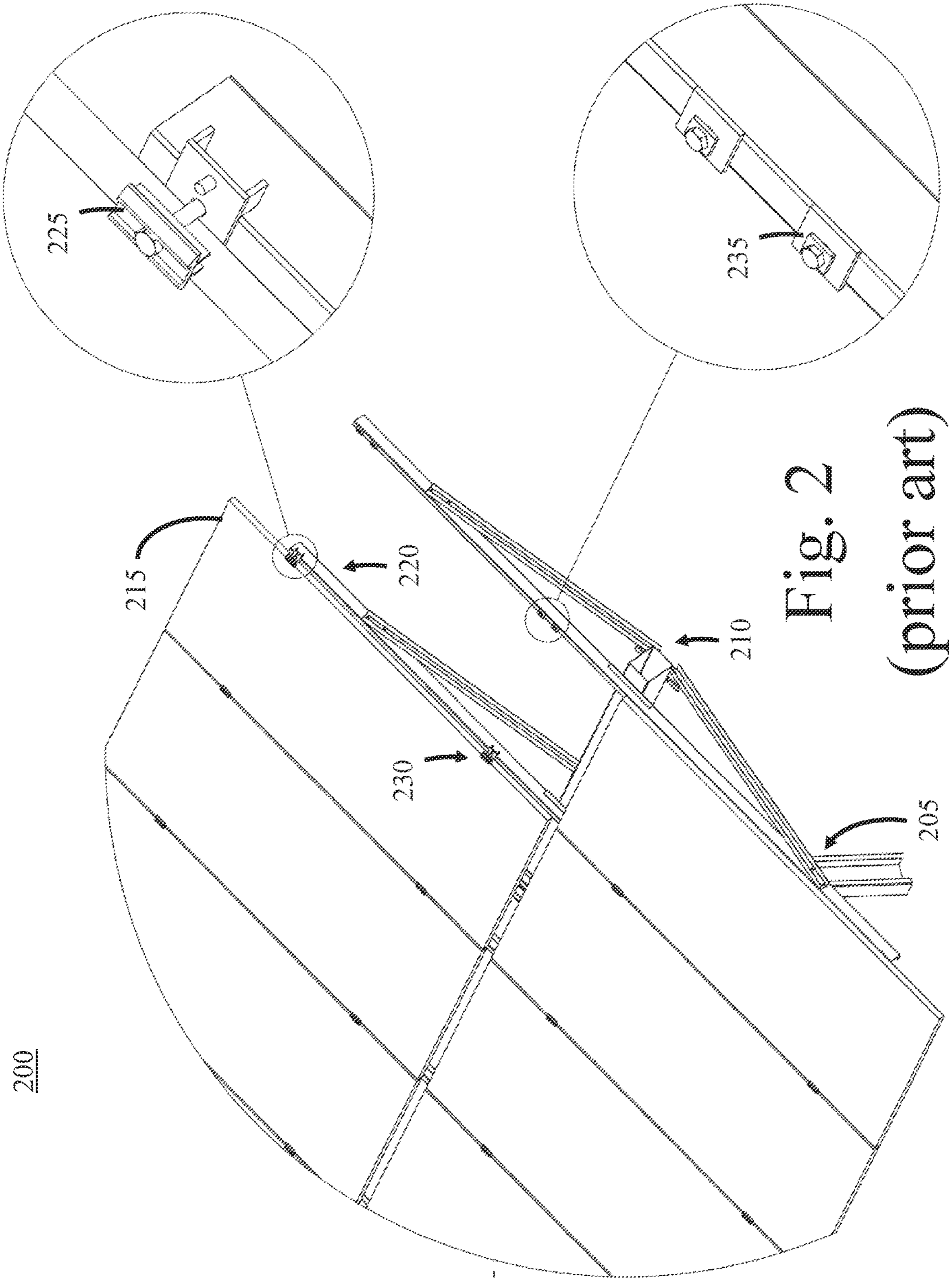
Fig. 2 (prior art)
FIG. 2 is an illustration of a portion of conventional photovoltaic array 200.

FIG. 2 is an illustration of a portion of conventional photovoltaic array 200. As shown in FIG. 2, the conventional photovoltaic array 200 includes multiple photovoltaic modules, such as photovoltaic module 215, which are connected to multiple purlins. The purlins are attached to center beam 210, which is mounted on top of pyle 205. In the conventional photovoltaic array 200 shown in FIG. 2, photovoltaic module 215 is connected to purlin 220 by mid fasteners 225 and 230. The photovoltaic modules along the edge of photovoltaic array 200 can be connected to the edge purlins with edge fasteners 235.

Figure 3:
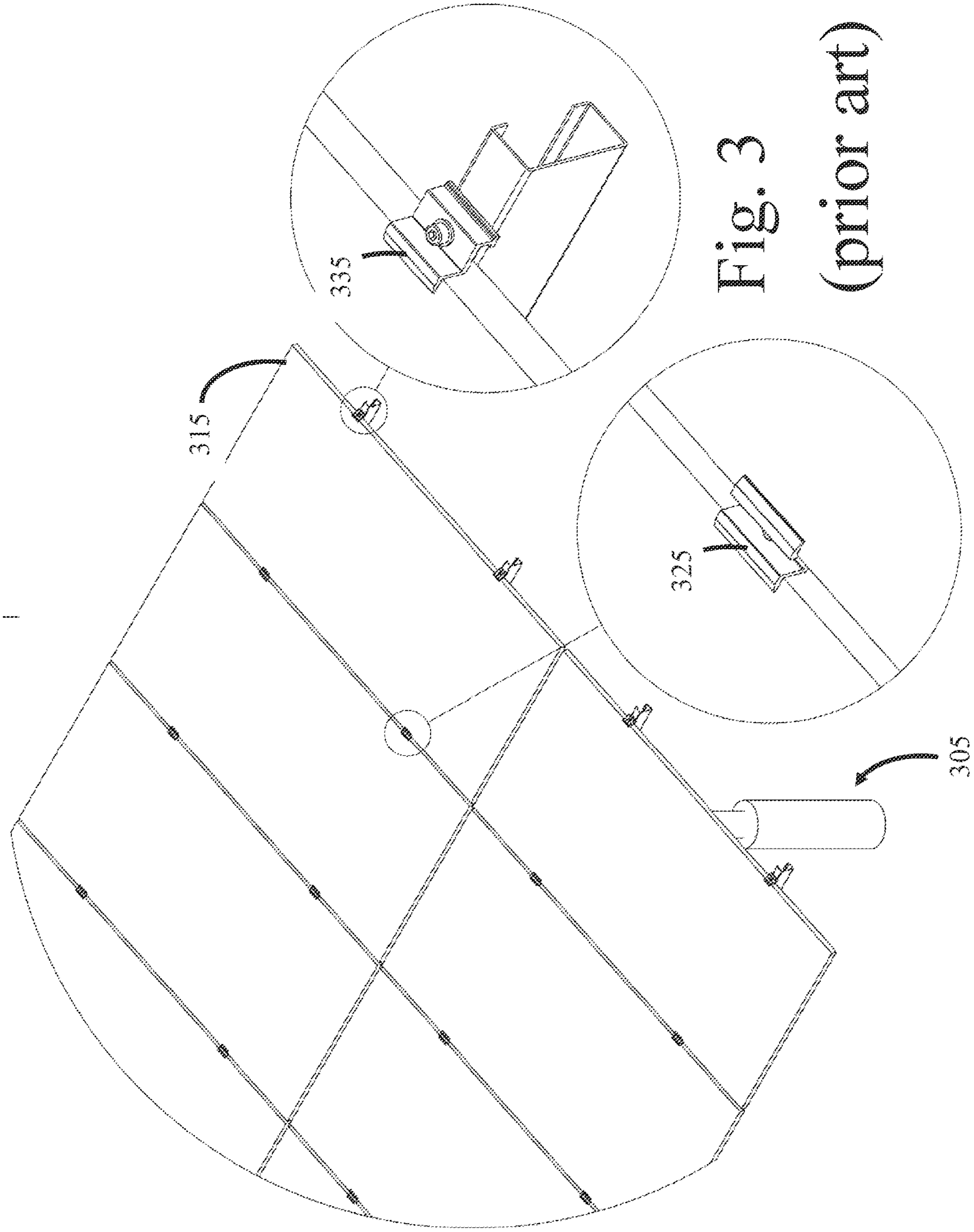
Fig. 3 (prior art)
FIG. 3 is an illustration of a portion of conventional photovoltaic array 300.

FIG. 3 is an illustration of a portion of conventional photovoltaic array 300. As shown in FIG. 3, the conventional photovoltaic array 300 includes multiple photovoltaic modules, such as photovoltaic module 315, which are connected to multiple purlins. The purlins are attached to a center beam which is mounted on top of pyle 305. In the conventional photovoltaic array 300 shown in FIG. 3, photovoltaic module 315 is connected to purlin 320 by, such as mid fastener 325. The photovoltaic modules along the edge of photovoltaic array 300 can be connected to the purlins with edge fasteners 335.

The conventional photovoltaic arrays shown in FIGS. 1-3 provide limited connection between the photovoltaic modules and the purlins upon which they are mounted. Specifically, as shown in FIGS. 1-3, the photovoltaic modules are connected to the purlins by a few fasteners, typically four fasteners per photovoltaic module. If the bolts used in one or more of fasteners become loose, the configuration of one or more photovoltaic modules in the photovoltaic array can become compromised. Furthermore, loose fasteners may comprise the configuration and deployment of the entire photovoltaic array. Accordingly, conventional photovoltaic arrays require significant upkeep, maintenance and repair.

Figure 4:
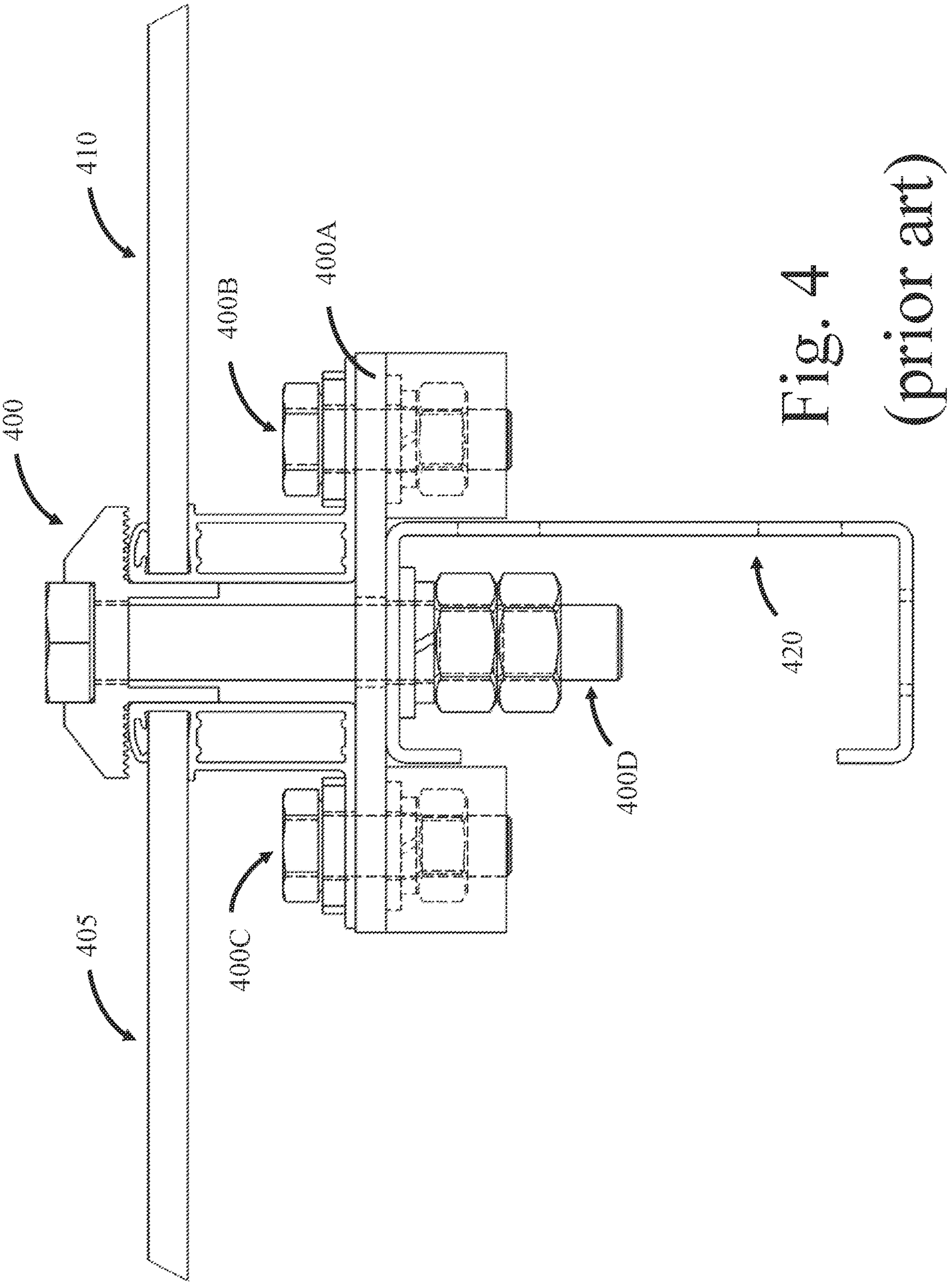
Fig. 4 (prior art)
FIG. 4 is an illustration of conventional mid-fastener 400.

FIG. 4 is an illustration of conventional mid-fastener 400. As shown in FIG. 4, mid-fastener 400 can indirectly connect photovoltaic modules 405 and 410 to purlin 420. Specifically, the photovoltaic modules 405 and 410 can be bolted to bottom plate 400A of mid-fastener 400 with bolts 400B and 400C. The mid-fastener bottom plate 400A can be connected to purlin 420 with bolt 400D. As shown in FIG. 4, conventional mid-fastener 400 has many points of connection between photovoltaic modules 405 and 410 and purlin 420. Each point of connection adds vulnerability and potential weakness to the photovoltaic array. These many points of connection can become loose or otherwise deficient, which can compromise the connection and the deployment of photovoltaic modules 405 and 410.

Figure 5:
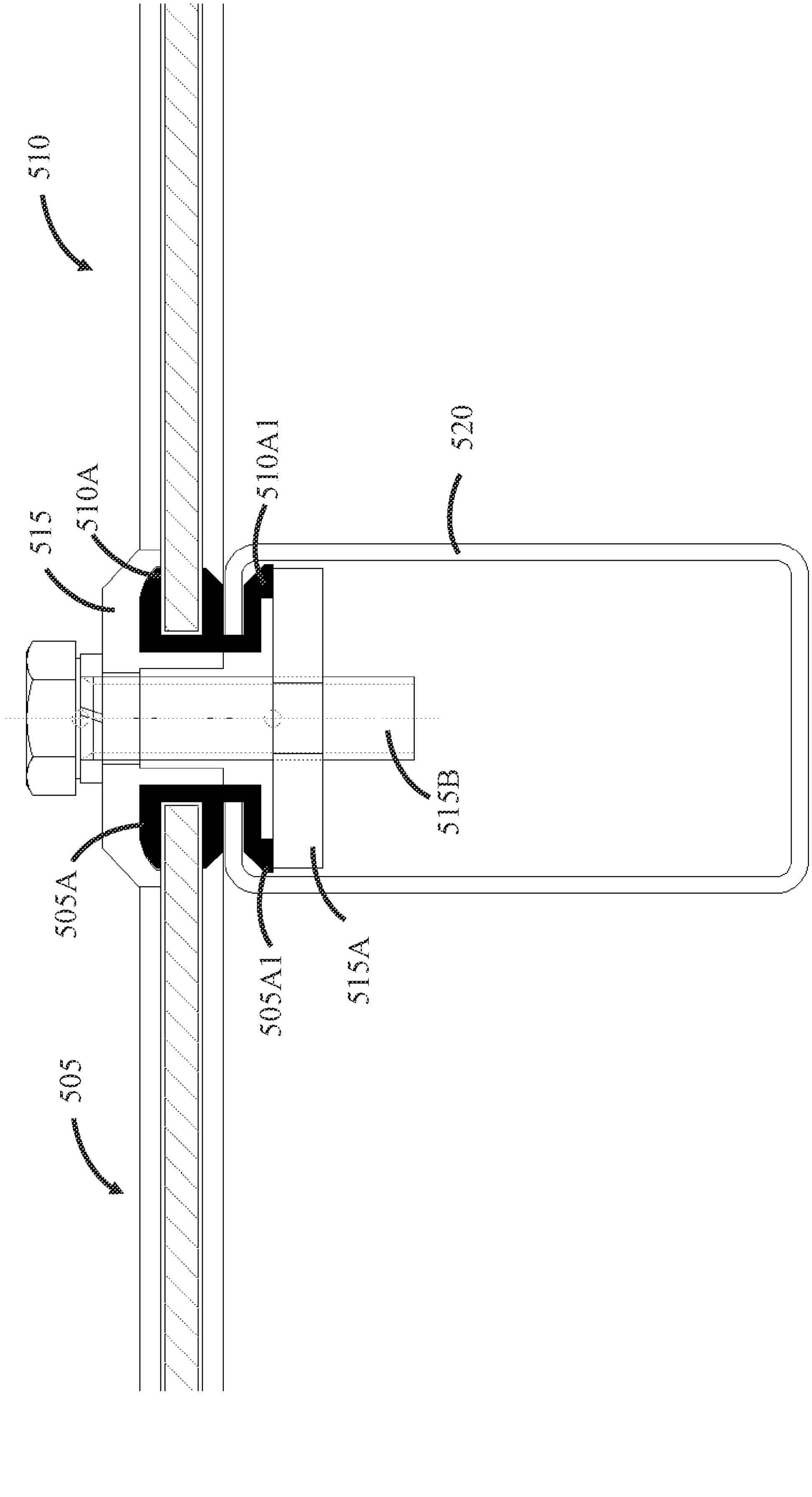
FIG. 5 is an illustration of photovoltaic module 505 and photovoltaic module 510 in accordance with some embodiments.

FIG. 5 is an illustration of photovoltaic module 505 and photovoltaic module 510 in accordance with some embodiments. As shown in FIG. 5, photovoltaic module 505 provides purlin engagement device 505A. In some embodiments, the purlin engagement device 505A is a separate component that is installed and/or configured on the edge of a photovoltaic module, such as photovoltaic module 505 and photovoltaic module 510. In other embodiments, the purlin engagement device 505A is an integral component that of the photovoltaic module disposed on the edge of a photovoltaic module. Purlin engagement device 505A is enabled to connect directly to purlin 520, as shown in FIG. 5, by enabling the lip of purlin 520 to be inserted into a purlin aperture in the purlin engagement device 505A. The purlin aperture in purlin engagement device 505A is a horizontal slot configured to receive the horizontally oriented lip of purling 520. Those of skill in the art will appreciate that in other embodiments, the purlin aperture can have other angles of orientation, such as vertically or at a 45 degree angle, and can be of different shapes to match the configuration of the mating lip component of a purlin. Similarly, photovoltaic module 510 provides purlin engagement device 510A. Purlin engagement device 510A is also enabled to connect directly to purlin 520, as shown in FIG. 5. Specifically, once the purlin 520 is engaged with the purlin engagement device 510A a direct and continuous connection exists between these two components for the length of the purlin engagement device 510A. Furthermore, as shown in FIG. 5, purlin fastener device 515 is enabled to further secure the connection between purlin engagement devices 505A and 510A and the purlin 520. In some embodiments, purlin fastener device 515 can include a bolt, which can be tightened to further secure the connection between purlin engagement devices 505A and 510A and purlin 520. In some embodiments, the purlin fastener device 515 includes a fastener support bar 515A that can be connected to the purlin fastener device 515 via bolt 515B. In some embodiments, the bolt 515B of purlin fastener device 515 can be tightened to squeeze the bottom tongue 505A1 of the purlin engagement device 505A upward, tightly connecting it to the coupling lips of the purlin 520 to prevent vertical sliding or other movement of photovoltaic module 505. Similarly, the bolt 515B of can be tightened to squeeze the bottom tongue 510A1 of the purlin engagement device 510A upward, tightly connecting it to the coupling lips of the purlin 520 to prevent vertical sliding or other movement of photovoltaic module 510. Those of skill in the art will appreciate that purlin fastener device 515 provides an embodiment of a mid-fastener device capable of fastening two adjacent photovoltaic modules, such as photovoltaic modules 505 and 510. Alternatively, those of skill in the art will appreciate that purlin fastener device 515 could be an edge fastener device, which secures only a single photovoltaic module and can be used along the edge of a photovoltaic array. Those of skill in the art will appreciate edge fastener device can include a fastener support bar that functions similar to the fastener support bar for mid-fastener device.

Figure 6:
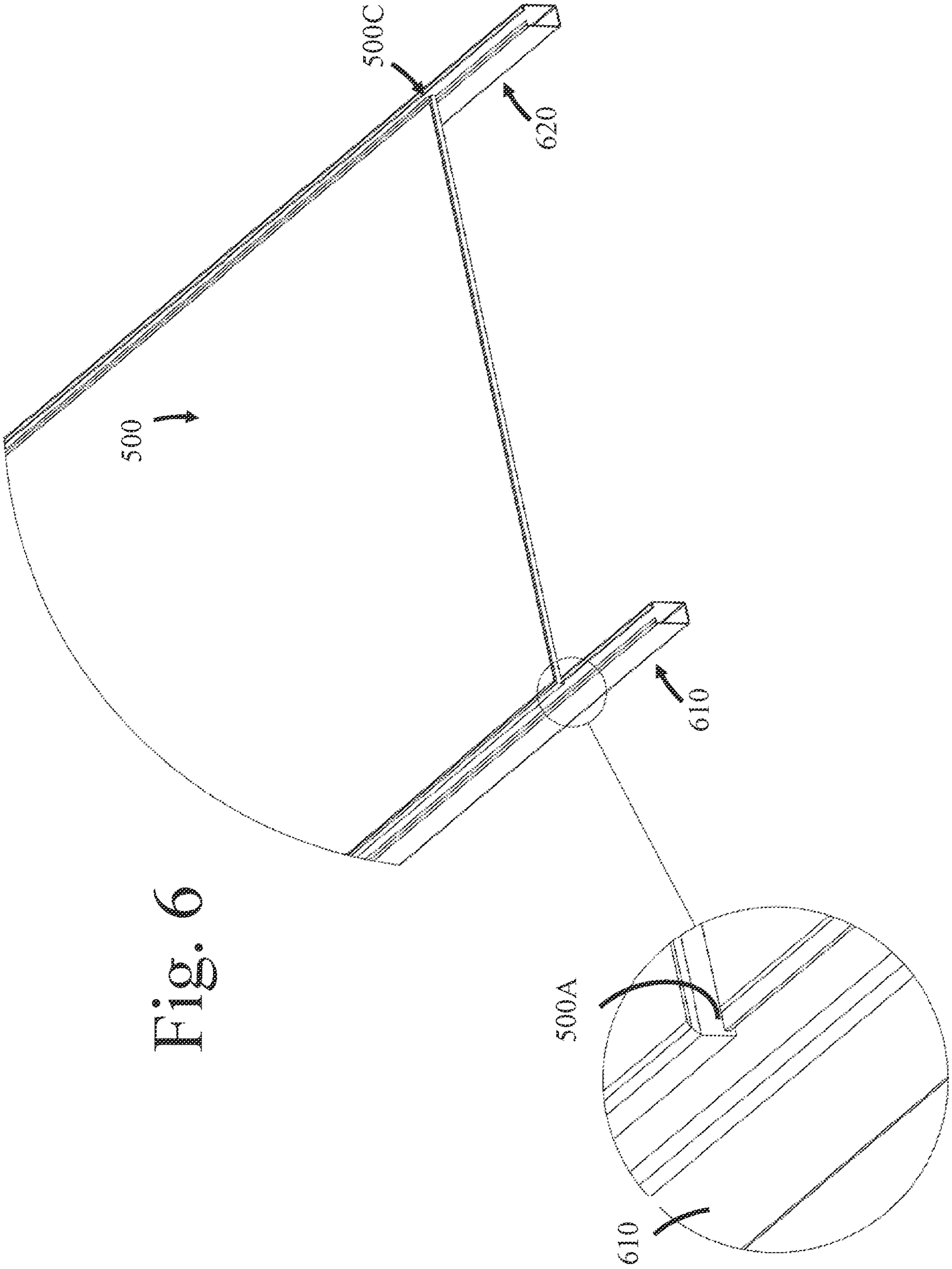
FIG. 6 is an illustration of photovoltaic module 500 in accordance with some embodiments.

FIG. 6 is an illustration of photovoltaic module 500 in accordance with some embodiments. The photovoltaic module 500 is depicted in FIG. 6 during the process of coupling purlin engagement device 500A to purlin 610 and coupling the purlin engagement device 500C to purlin 620. In some embodiments, such as the embodiment shown in FIG. 6, the purlin engagement devices are configured to be slidably engaged with the purlin. As shown in expanded view illustration in FIG. 6, the purlin engagement device 500A can be slidably engaged with purlin 610. As part of this slidable engagement, in some embodiments the edge of purlin 610 is inserted into the purlin aperture. i.e. and open slot in purlin engagement device 500A. Accordingly, in some embodiments, the purlin engagement device can be easily, conveniently, and securely coupled to the purlin by sliding the purlin into a purlin aperture in the purlin engagement device. Furthermore, in accordance with some embodiments, a strong and reliable connection can be made between the photovoltaic module and the purlin. In the embodiment shown in FIG. 6, a first method of engaging purlin engagement device 500C and purlin 620 is shown, namely the purlin engagement device 500C is slidably engaged with purlin 620. Those of skill in the art will appreciate that this slidably engaged can be conveniently undone by reversing the sliding engagement action. Alternatively, in a second method of engaging the purlin engagement device 500C and purlin 620, not shown in FIG. 6, the purlin engagement device 500C can be aligned with the purlin 620 and then snapped into place with a pressing or clamping force. The second method of engaging can be undone by pulling apart the purlin engagement device 500C and purlin 620.

Significantly, the surface area in contact between the photovoltaic module and the purlin is increased by the use of the purlin engagement device in comparison to conventional systems. The photovoltaic module 500 in the embodiment shown in FIG. 6 is in the process being coupled to purlin 610, and once the photovoltaic module 500 is fully connected to purlin 610, the majority of purlin engagement device 500A will be in physical contact with purlin 610. Thus, in the embodiment shown in FIG. 6, the majority of the long edge of the photovoltaic module 500 will be in physical contact and engaged connection with the purlin. The configuration enabled by the purlin engagement device in accordance with some embodiments the present invention provides many advantages over conventional systems and methods for connecting a photovoltaic module to a racking system. For example, the increased surface area of the connection and engagement between the purlin engagement device and the purlin enables a more secure connection that is more resistant to separation forces such as torque. The strong connection between the purlin engagement device on the photovoltaic module and the purlin can ensure good and continuous support between the photovoltaic module and the racking system, which results in increased unity between the photovoltaic module and racking system. Accordingly, embodiments enable photovoltaic modules to be more durably and reliably deployed in photovoltaic arrays and, thereby, more resistant to wind, rain, snow, storms, and other natural phenomenon. The more durable and reliable connection enabled by the embodiments of the purlin engagement device reduces the amount of maintenance and repair that may be required for photovoltaic arrays in a solar farm, as the photovoltaic modules are more reliably deployed and less subject to damage.

Those of skill in the art will appreciate that for some embodiments of the purlin engagement device, less than the majority of the length of the edge of the photovoltaic module 500 can be in contact with the purlin and still achieve the advantages of the embodiments of the present invention. For example, in some embodiments less than 75% of the length of an edge of the photovoltaic module 500 can be contact with the purlin. In other embodiments, less than 50% and other less than 25% of the length of an edge of the photovoltaic module 500 can be contact with the purlin. Even embodiments with only 10% of the length of an edge of the photovoltaic module 500 in contact with the purlin exhibit advantages over the conventional designs in which coupling between the photovoltaic module and the purlin is more limited. For example, in a conventional photovoltaic array, the edge of the photovoltaic module does not directly couple to the purlin, and the edge of the photovoltaic module is often only indirectly connected to the purlin at the locations of the conventional fasteners, which can be as few as two fasteners per photovoltaic module.

The increased surface area of contact between the purlin engagement device and the purlin enabled by embodiments of the present invention provides for a more sustainable and durable connection between the photovoltaic module and the purlin. This improved connection between photovoltaic module and the purlin can better resist separation forces which may be induced on the photovoltaic modules of a photovoltaic array by wind, rain, snow, storms, and other weather phenomenon. A photovoltaic module configured with the purlin engagement device of the embodiments of the present invention can provide increased strength and rigidity to a deployed photovoltaic module in a solar farm in comparison to conventional systems. Furthermore, the purlin engagement device of the embodiments of the present invention can improve the connection with the mounting underneath the photovoltaic module, such as the purlin of the racking system. Those of skill in the art will appreciate that such improved strength, rigidity, and connection become more important as the size of photovoltaic modules increases. The increased mass and size of photovoltaic modules introduces more separating forces and damaging forces as a result of weather phenomenon on the photovoltaic modules and the components of the racking systems that support them. Accordingly, the advantages of the purlin engagement device enabled by embodiments of the present invention are of greater importance as the size and weight of the overall photovoltaic array increases.

Significantly, one of the advantages enabled by some of the embodiments of the present invention, is a reduction in the required rigidity of the materials of the photovoltaic module. In conventional systems, the edges of the photovoltaic modules are substantially rigid, and thus constructed of costly materials, to ensure the integrity of the photovoltaic module. In some embodiments of the present invention, the strong connection enabled by the purlin engagement device and the purlin is such that the integrity of the edge of the photovoltaic module can be supported and supplanted, at least in part, by the rigidity of the purlin. In many photovoltaic arrays, purlins are made of strong metals as they serve to ensure the rigidity and durability of the racking system of the photovoltaic array. In some embodiments of the present invention, the connection between the purlin engagement device of the photovoltaic module and the purlin is sufficiently continuous and solid such that only one of the purlin engagement device of the photovoltaic module or the purlin needs to be made of rigid materials. Accordingly, in some embodiments of the present invention, the edge of the photovoltaic module can be made of lighter and less rigid materials than the edges of conventional photovoltaic modules. For example, an embodiment of the photovoltaic module with a purlin engagement device can have between 40% to 60% less material usage than a conventional photovoltaic module. Moreover, the increased support structure for the photovoltaic module enabled by the embodiments of the purlin engagement device greatly improves the load conditions on the purlin and provides more uniformly distributed support, as compared to the conventional point support of the fasteners of conventional photovoltaic modules.

Figure 7:
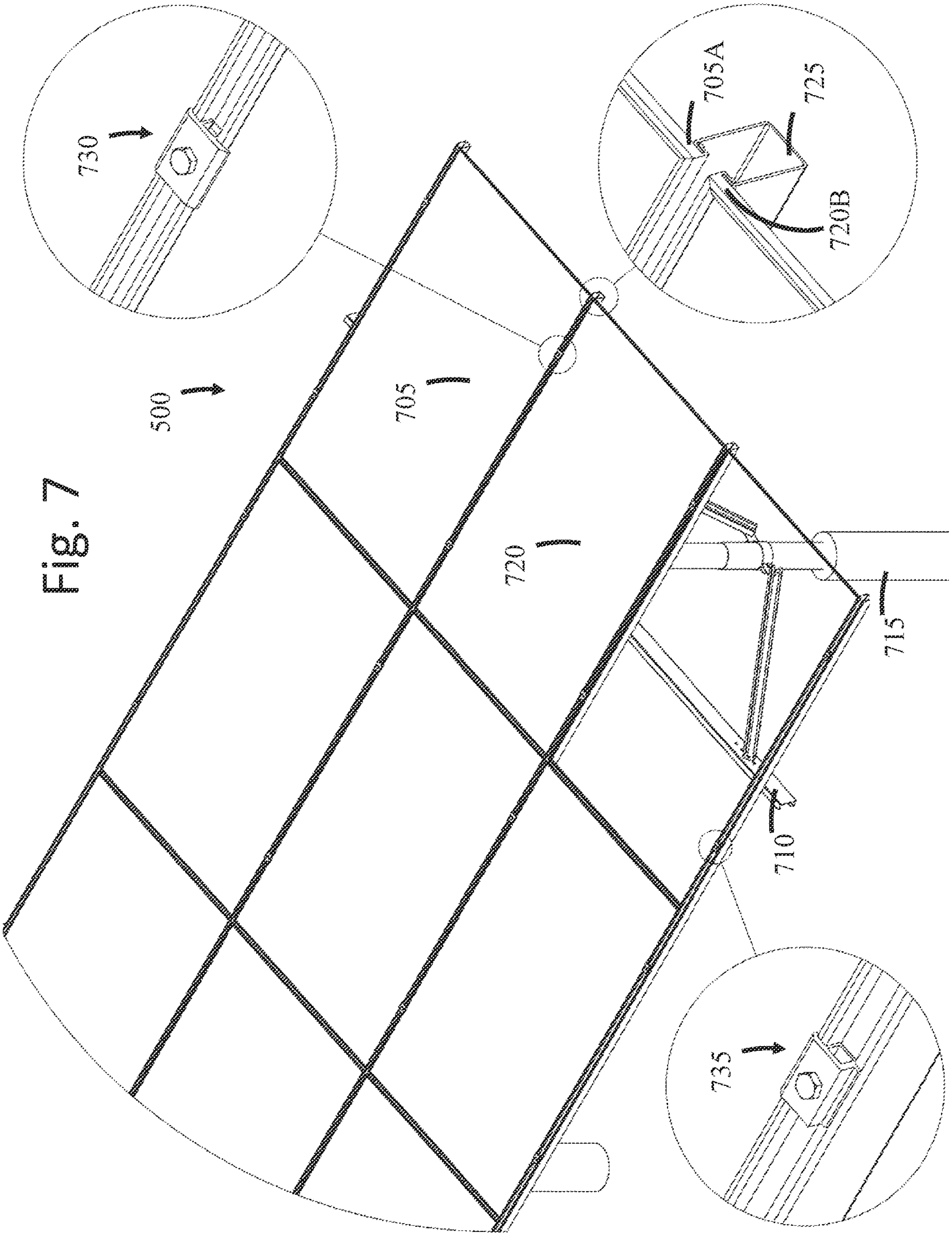
FIG. 7 provides an illustration of photovoltaic array 700 in accordance with some embodiments.

FIG. 7 provides an illustration of photovoltaic array 700 in accordance with some embodiments. The photovoltaic array 700 embodiment shown in FIG. 7 has multiple photovoltaic modules, such as photovoltaic modules 705 and 720, and these photovoltaic modules are oriented such that the long edge of the photovoltaic module is parallel to the center beam 710 mounted on pyle 715. As shown in the expanded view in FIG. 7, the purlin engagement device 705A of photovoltaic module 705 is coupled to purlin 725, in other words, the purlin engagement device 705A has been slidably engaged with purlin 725. Similarly, as shown in the expanded view in FIG. 7, the purlin engagement device 720B of photovoltaic module 720 is coupled to purlin 725, in other words, the purlin engagement device 720B has been slidably engaged with purlin 725. In the embodiment shown in FIG. 7, the purlin 725 is mounted on center beam 710, which is mounted on pyle 715.

Photovoltaic module 705 can be further secured to the purlins with purlin mid-fastener devices, such as purlin mid-fastener device 730, and purlin edge fastener devices, similar to purlin edge fastener device 735. Alternatively, those photovoltaic modules that are not on the edge of the photovoltaic array, can be further secured to the purlins with only purlin mid-fastener devices, similar to purlin mid-fastener device 730. In some embodiments, the purlin mid-fastener devices and purlin edge fastener devices can be provided with bolts and nuts that can be tightened to further secure the purlin engagement device to the purlin. In accordance with the increased surface area of the connection between the purlin engagement device and the purlin, some embodiments may require fewer purlin fastening devices to secure a photovoltaic module to a purlin than the amount of conventional fastening devices required by conventional systems. Furthermore, the purlin mid-fastener device 730 and purlin edge fastener device 735 provided in accordance with some embodiments serve to further secure the physical connection already established between the purlin engagement device and the purlin after they are engaged, applying a force between the purlin engagement device and the purlin to restrict the lateral movement of the photovoltaic module associated with the purling engagement device. Furthermore, in some embodiments, the purlin fastener device can serve to force the frame to sit in a more flush manner on the coupling lips of purlin, thereby providing good and continuous support between the photovoltaic module and the racking system of the photovoltaic array and promote additional unity and rigidity among the components of the photovoltaic array. In some embodiments, the purlin fastener device can serve to create and maintain more consistent spacing between adjacent photovoltaic modules.

Figure 8:
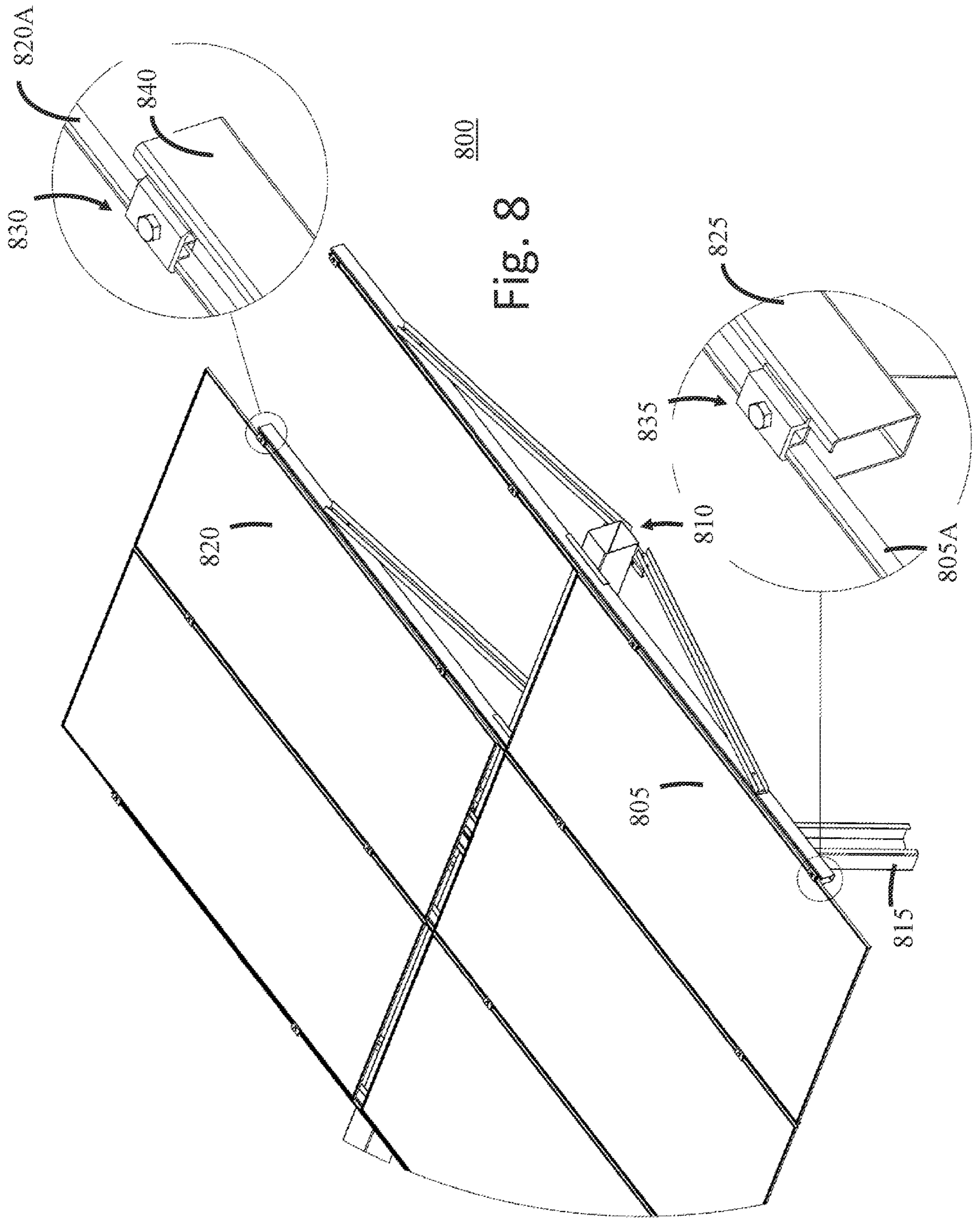
FIG. 8 provides an illustration of photovoltaic array 800 in accordance with some embodiments.

FIG. 8 provides an illustration of photovoltaic array 800 in accordance with some embodiments. The photovoltaic array 800 embodiment shown in FIG. 8 has multiple photovoltaic modules, such as photovoltaic modules 805 and 820, and these photovoltaic modules are oriented such that the long edge of the photovoltaic module is perpendicular to the center beam 810 mounted on pyle 815. As shown in one of the expanded views in FIG. 8, the purlin engagement device 805A of photovoltaic module 805 is coupled to purlin 825, in other words, the purlin engagement device 850A has been slidably engaged with purlin 825. Similarly, as shown in one of the expanded views in FIG. 8, the purlin engagement device 820A of photovoltaic module 820 is coupled to purlin 840, in other words, the purlin engagement device 820A has been slidably engaged with purlin 840. In the embodiment shown in FIG. 8, the purlin 825 is mounted on center beam 810 which is mounted on pyle 815. Photovoltaic module 805 can be further secured to the purlins with purlin mid-fastener devices, such one similar to purlin mid-fastener device 830, and purlin edge fastener devices, such as purlin edge fastener device 835. Alternatively, those photovoltaic modules that are not on the edge of the photovoltaic array, can be further secured to the purlins with only purlin mid-fastener devices, similar to purlin mid-fastener device 835. In some embodiments, the purlin mid-fastener devices and purlin edge fastener devices can be provided with bolts and nuts that can be tightened to further secure the purlin engagement device to the purlin. In accordance with the increased surface area of the connection between the purlin engagement device and the purlin, some embodiments may require fewer purlin fastening devices to secure a photovoltaic module to a purlin than the amount of conventional fastening devices required by conventional systems. Furthermore, the purlin mid-fastener device 830 and purlin edge fastener device 835 provided in accordance with some embodiments serve to further secure the physical connection already established between the purlin engagement device and purlin after they are engaged.

Figure 9:
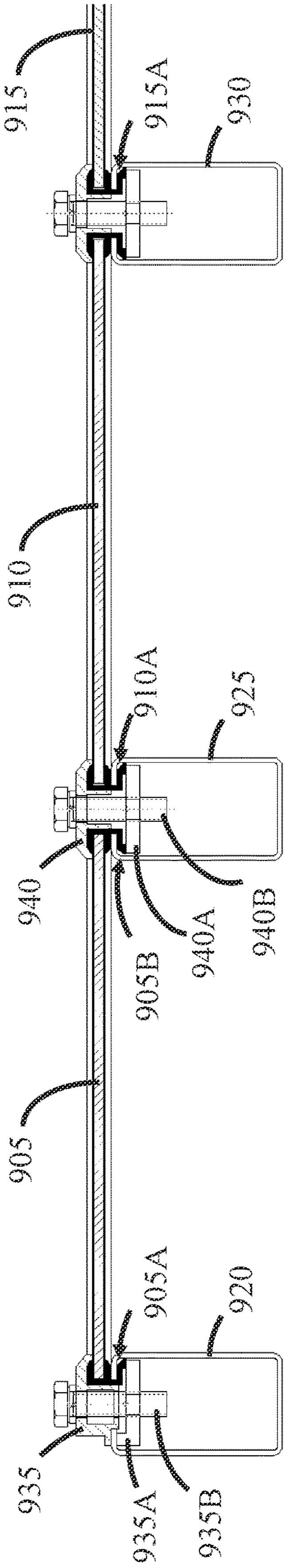
FIG. 9 provides an illustration of photovoltaic array 900 in accordance with some embodiments.

FIG. 9 provides an illustration of photovoltaic array 900 in accordance with some embodiments. The embodiment of photovoltaic array 900 illustrated in FIG. 9 includes photovoltaic modules 905, 910 and 915. As shown in FIG. 9, photovoltaic module 905 is mounted along the edge of photovoltaic array 900. Specifically, purlin engagement device 905A of photovoltaic module 905 is engaged with purlin 920. Notably, the embodiment shown in FIG. 9 enables direct and physical engagement between purlin engagement device 905A and purlin 920. In some embodiments, purlin engagement device 905A can be slidably engaged with purlin 920 such that the lip of purlin 920 is securely seated at least partially inside the aperture in purlin engagement device 905A. Once the purlin 920 is engaged with the purlin engagement device 905A, a direct and continuous connection exists between the two components for the length of the purlin engagement device 905A in the embodiment shown in FIG. 9.

As shown in the embodiment in FIG. 9, purlin fastener device 935 is enabled to further secure the connection between purlin engagement device 905A and the purlin 920. As shown in the embodiment in FIG. 9, purlin fastener device 935 can be an edge fastener device positioned along the edge of the photovoltaic array 900. In some embodiments, purlin fastener device 935 can include a bolt 935B, which can be tightened to engage and secure the connection between purlin engagement device 905A and purlin 920. In some embodiments, the purlin fastener device 935 includes a fastener support bar 935A that can be connected to the purlin fastener device 935 via bolt 935B. In some embodiments, the bolt 935B of purlin fastener device 935 can be tightened to squeeze the bottom tongue of the purlin engagement device 905A upward, tightly connecting it to the coupling lips of the purlin 920 to prevent vertical sliding or other movement of photovoltaic module 905.

As shown in the embodiment in FIG. 9, the other side of photovoltaic module 905 can be secured to purlin 925. Specifically, purlin engagement device 905B of photovoltaic module 905 is engaged with purlin 925. Notably, the embodiment shown in FIG. 9 enables direct and physical engagement between purlin engagement device 905B and purlin 925. In some embodiments, purlin engagement device 905B can be slidably engaged with purlin 925 such that the lip of purlin 925 is securely seated at least partially inside the purlin aperture in purlin engagement device 905B. Once the purlin 925 is engaged with the purlin engagement device 905B, a direct and continuous connection exists between the two components for the length of the purlin engagement device 905B in the embodiment shown in FIG. 9.

As shown in the embodiment in FIG. 9, purlin fastener device 940 is enabled to further secure the connection between purlin engagement device 905B and the purlin 925. As shown in the embodiment in FIG. 9, purlin fastener device 940 can be a purlin mid-fastener device positioned between two photovoltaic modules in the photovoltaic array. In some embodiments, purlin fastener device 940 can include a bolt 940B, which can be tightened to engage and secure the connection between purlin engagement device 905B and purlin 925. In some embodiments, the purlin fastener device 940 includes a fastener support bar 940A that can be connected to the purlin fastener device 940 via bolt 940B. In some embodiments, the bolt 940B of purlin fastener device 940 can be tightened to squeeze the bottom tongue of the purlin engagement device 910A upward, tightly connecting it to the coupling lips of the purlin 925 to prevent vertical sliding or other movement of photovoltaic module 905. Furthermore, as shown in the embodiment in FIG. 9, purlin fastener device 940 is a mid-fastener device and is enabled to further secure the connection between purlin engagement device 910A of photovoltaic module 910 and the purlin 925.

As shown in the embodiment in FIG. 9, photovoltaic module 915 can be secured to purlin 930. Specifically, purlin engagement device 915A of photovoltaic module 915 is engaged with purlin 930. Notably, the embodiment shown in FIG. 9 enables direct and physical engagement between purlin engagement device 915A and purlin 930. In some embodiments, purlin engagement device 915A can be slidably engaged with purlin 930 such that the lip of purlin 930 is securely seated at least partially inside the purlin aperture in purlin engagement device 915A. Once the purlin 930 is engaged with the purlin engagement device 915A, a direct and continuous connection exists between the two components for the length of the purlin engagement device 915A in the embodiment shown in FIG. 9.

Figure 10:
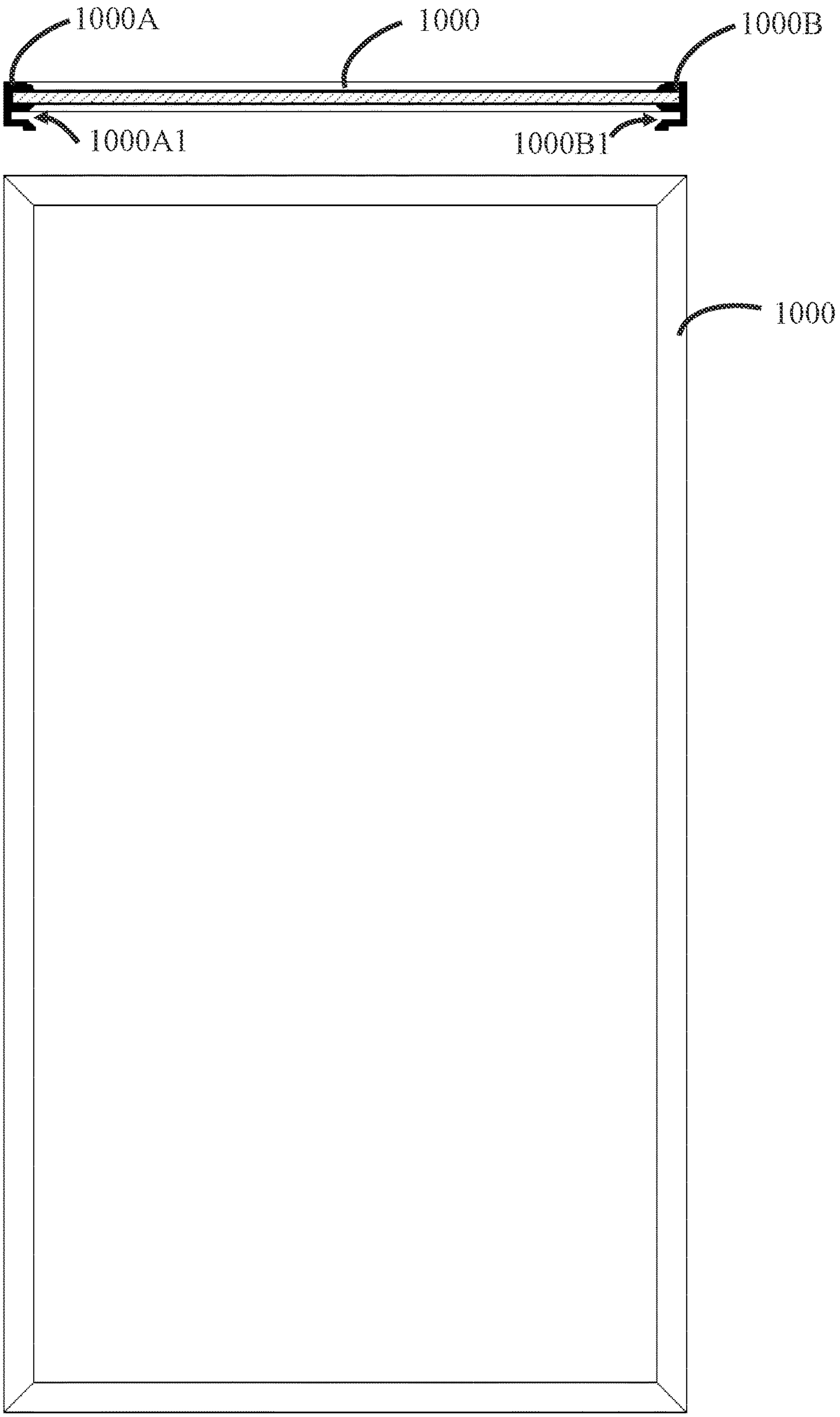
FIG. 10 is an illustration of photovoltaic module 1000 in accordance with some embodiments.

FIG. 10 is an illustration of photovoltaic module 1000 in accordance with some embodiments. FIG. 10 provides an illustration of photovoltaic module 1000 from an overhead perspective and an illustration of from a side view perspective. As shown in the embodiment illustrated in FIG. 10, photovoltaic module 1000 includes purling engagement device 1000A which includes purlin aperture 1000A1 to engage with and be coupled to a purlin. Furthermore, purlin engagement device 1000B, as shown in the embodiment illustrated in FIG. 10, includes purlin aperture 1000B1 to receive the lip of a purlin for engagement.

Figure 11:
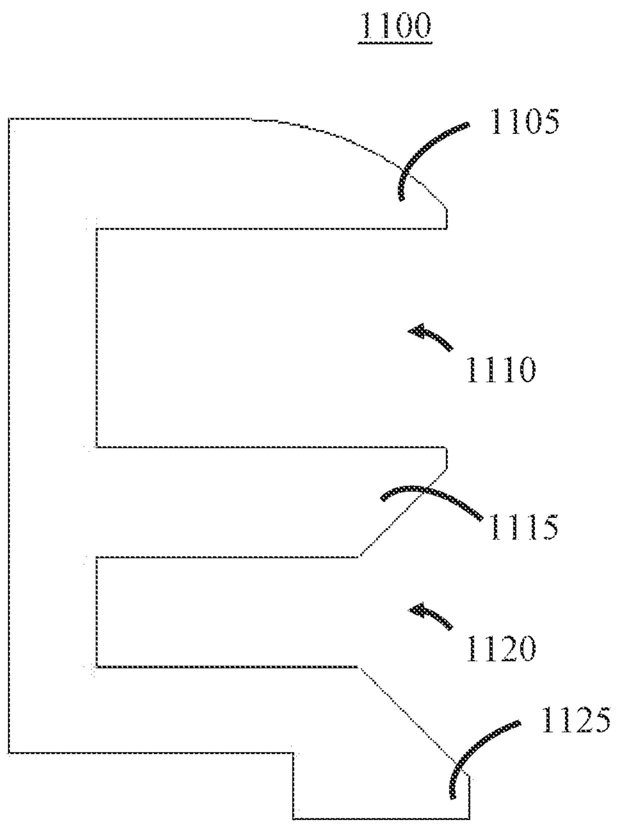
FIG. 11 is an illustration of a cross section of purlin engagement device 1100 in accordance with some embodiments.

FIG. 11 is an illustration of a cross section of purlin engagement device 1100 in accordance with some embodiments. In some embodiments, the photovoltaic module will provide a purlin engagement device 1100 on two of the four sides of a photovoltaic module, which can generally be referred to as the fastening edges of the photovoltaic module because they will fasten to the purlin. In these embodiments, the other two edges of the photovoltaic module are non-fastening edges which do not provide a purlin engagement device. Those of skill in the art will appreciate that in other embodiments, the photovoltaic module has only one edge which includes a purlin engagement device. Still other embodiments of the photovoltaic module could provide a purlin engagement device on all four sides of the module or on three sides of the module.

As shown in the embodiment illustrated in FIG. 11, the purlin engagement device 1100 can include a module glass aperture 1110, which can receive the glass component of the photovoltaic module between the top tongue 1105 of the purlin engagement device 1100 and the mid-tongue 1115 of the purlin engagement device 1110. Furthermore, the purlin engagement device 1100 can include a purlin receiving aperture 1120, which can receive the lip of a purlin between the mid-tongue 1115 of the purlin engagement device 1100 and the bottom tongue 1125 of the purlin engagement device 1110. As shown in FIG. 11, in some embodiments the mid-tongue 1115 and the bottom tongue 1125 can tips that are slated at opposite angles to enable a wider purlin receiving aperture 1120 for easier engagement of the purlin.

In addition, in some embodiments, bottom tongue 1125 may be flat or locally thickened at its opening tip. This design of bottom tongue 1125 can enhance the strength of the opening end of bottom tongue 1125 and, when the fastener bar presses upward, the thickened bottom tongue 1125 can create a stronger bite into the coupling lips of the purlin to prevent vertical sliding of the photovoltaic module on the racking system.

Figure 12:
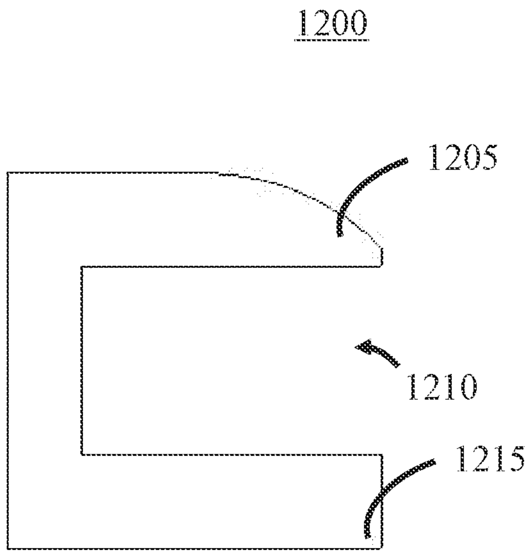
FIG. 12 is an illustration of a cross section of non-fastening edge 1200 of a photovoltaic module in accordance with some embodiments.

FIG. 12 is an illustration of a cross section of non-fastening edge 1200 of a photovoltaic module in accordance with some embodiments, the non-fastening edge 1200 can include a module glass aperture 1210, which can receive the glass component of the photovoltaic module between the top tongue 1205 of the non-fastening edge 1200 and the bottom tongue 1215 of the non-fastening edge 1200. In some embodiments, the photovoltaic module will provide non-fastening edges, such as non-fastening edge 1200 on two of the four sides of the photovoltaic module, which would not be fastened to a purlin. In these embodiments, the other two edges of the photovoltaic module provide a purlin engagement device for engaging with a purlin. Those of skill in the art will appreciate that in other embodiments, the photovoltaic module has only one edge which includes a non-fastening edge. Still other embodiments of the photovoltaic module could provide a non-fastening edge on three sides of the module.

Figure 13:
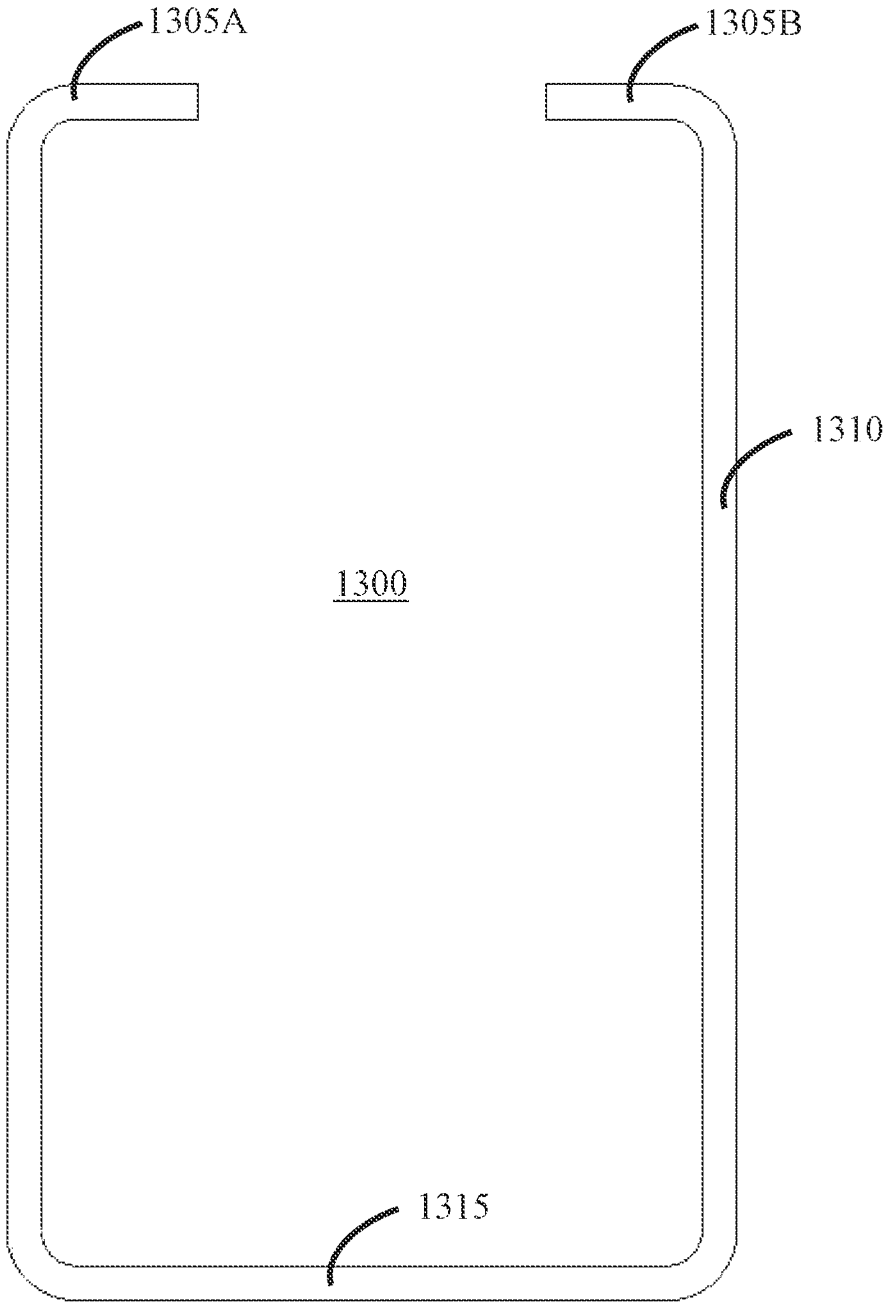
FIG. 13 is an illustration of a cross section of purlin 1300 of a racking system in accordance with some embodiments.

FIG. 13 is an illustration of a cross section of purlin 1300 of a racking system in accordance with some embodiments. In the embodiment shown in FIG. 13, the purlin 1300 has coupling lips 1305A and 1305B. In some embodiments, the coupling lips 1305A and 1305B can engage with the purlin engagement device of a photovoltaic module. Accordingly, in some embodiments, the purlin engagement devices are engaged with and coupled to coupling lips 1305A and 1305B of purlin 1300. Purlin 1300 shown in the embodiment illustrated in FIG. 13 also includes side edge 1310 and bottom edge 1315. Those of skill in the art will appreciate that purlin 1300 can be secured to the racking system of a photovoltaic array, such as being mounted to a center beam which is mounted to a pyle.

Figure 14:
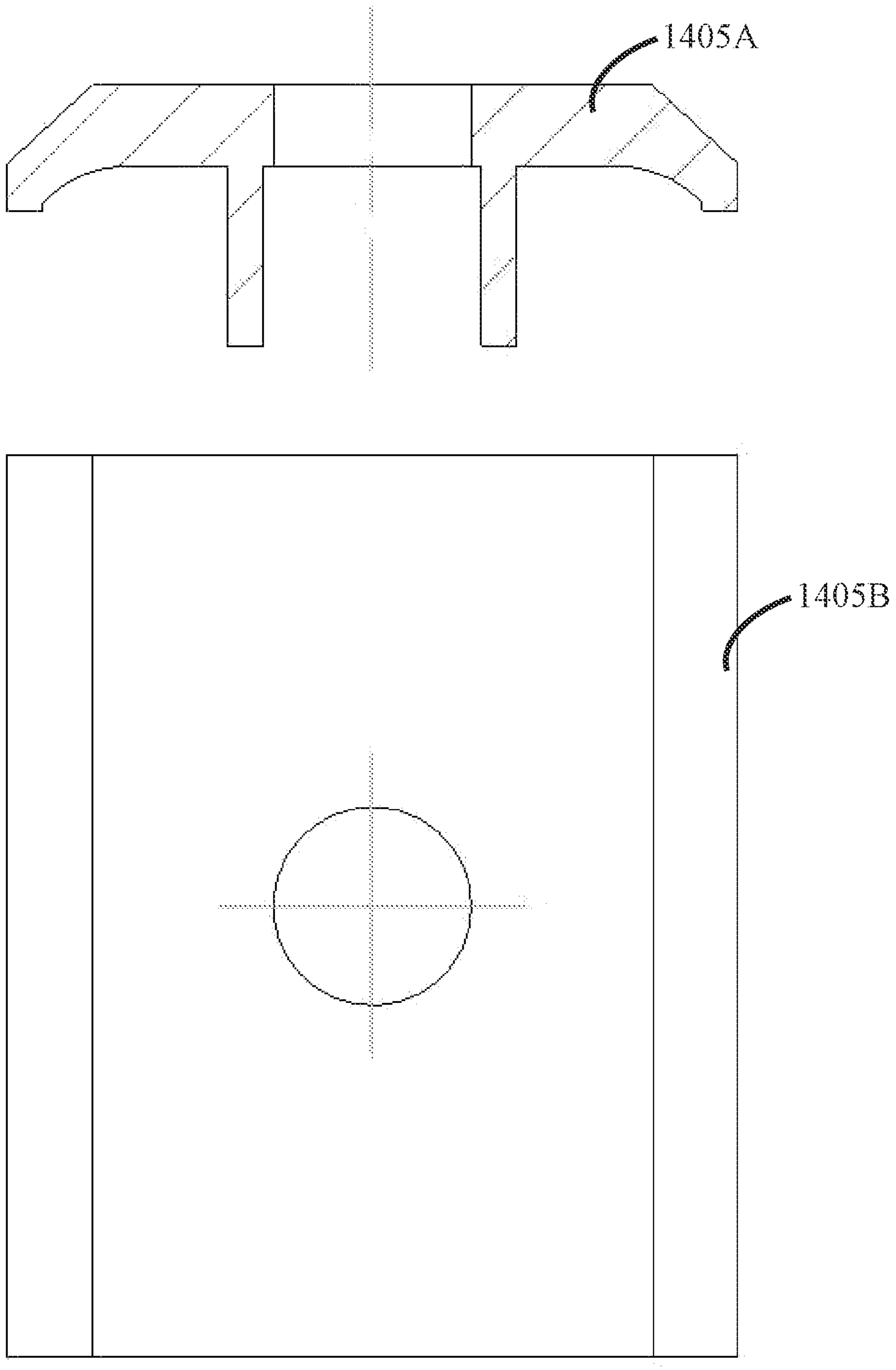
FIG. 14 is an illustration of a top component of a purlin fastening device in accordance with some embodiments.

FIG. 14 is an illustration of a top component of a purlin fastening device in accordance with some embodiments. FIG. 14 provides an illustration of purlin fastening device 1405B from an overhead perspective and an illustration of purlin fastening device 1405A from a side view perspective. The top component 1405A of a purlin fastening device illustrated in FIG. 14 is enabled to engage a portion of the top of a purlin engagement device. The top component 1405A of a purlin fastening device illustrated in the embodiment shown in FIG. 14 is configured for a mid-fastening device capable of engaging two purlin engagement devices, one on each side. In some embodiments, the mid-fastening top component 1405A of a purlin fastening device is deployed in the middle of the photovoltaic array. Those of skill in the art will appreciate that purlin fastening device 1405A can be constructed of a variety of materials, including metal alloys, aluminum, and steel.

Figure 15:
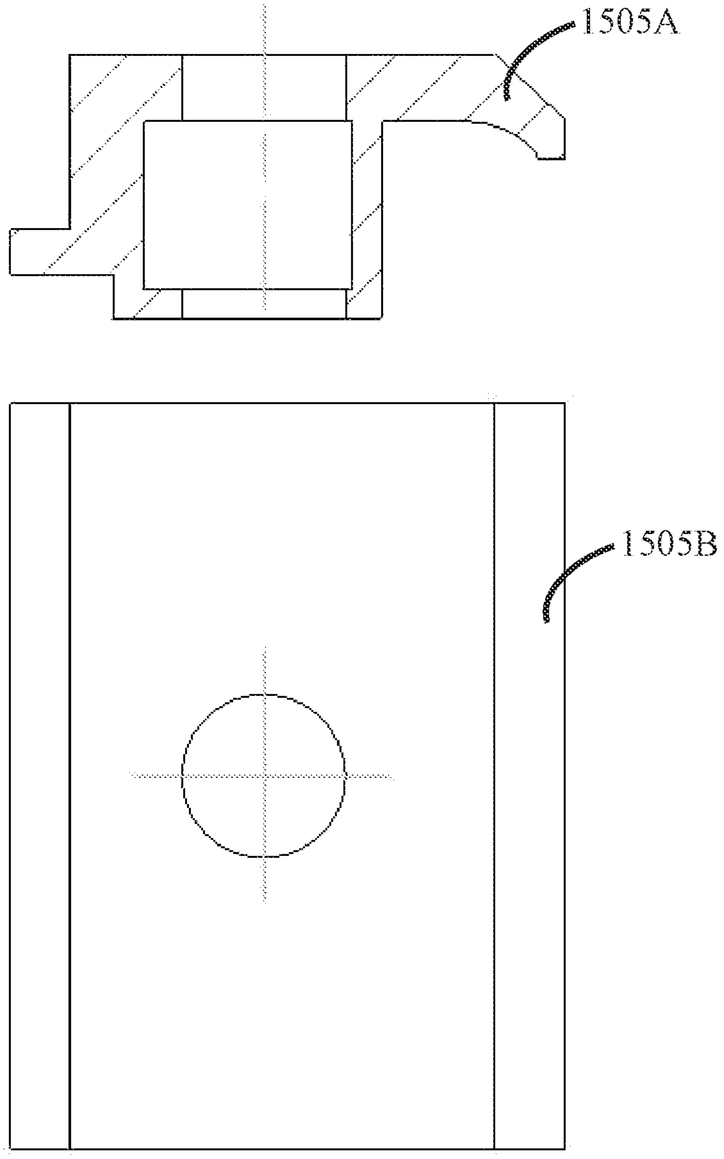
FIG. 15 is an illustration of a top component of a purlin fastening device in accordance with some embodiments.

FIG. 15 is an illustration of a top component of a purlin fastening device in accordance with some embodiments. FIG. 15 provides an illustration of purlin fastening device 1505B from an overhead perspective and an illustration of purlin fastening device 1505A from a side view perspective. The top component 1505A of a purlin fastening device illustrated in FIG. 15 is enabled to engage a portion of the top of a purlin engagement device. The top component 1505A of a purlin fastening device illustrated in the embodiment shown in FIG. 15 is configured for an edge fastening device capable of engaging one purlin engagement device. In some embodiments, the edge fastening top component 1505A of a purlin fastening device is deployed at the edge of the photovoltaic array. Those of skill in the art will appreciate that purlin fastening device 1505A can be constructed of a variety of materials, including metal alloys, aluminum, and steel.

Figure 16:
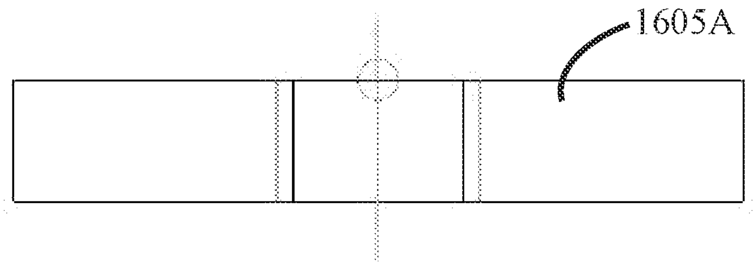
FIG. 16 is an illustration of a fastener support bar of a purlin fastening device in accordance with some embodiments.
Figure 16:
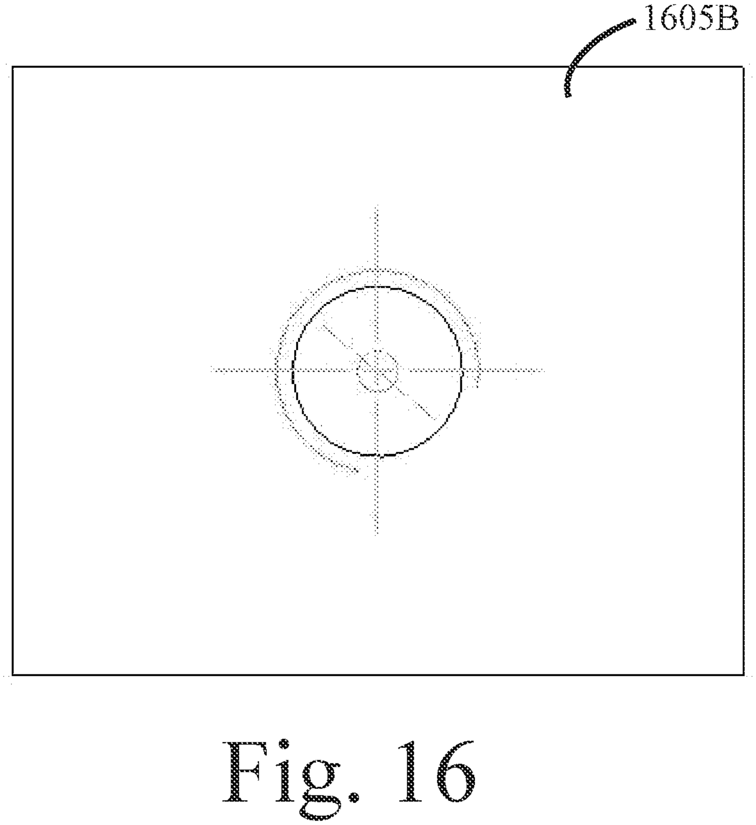

FIG. 16 is an illustration of a fastener support bar of a purlin fastening device in accordance with some embodiments. FIG. 16 provides an illustration of fastener support bar 1605B from an overhead perspective and an illustration of fastener support bar 1605A from a side view perspective. The fastener support bar 1605A of a purlin fastening device illustrated in FIG. 16 is enabled to engage a portion of the bottom of a purlin engagement device. The fastener support bar 1605A of a purlin fastening device illustrated in the embodiment shown in FIG. 16 is configured for a mid-fastening device capable of engaging two purlin engagement devices. Those of skill in the art will appreciate that fastener support bar 1605A can be constructed of a variety of materials, including metal alloys, aluminum, and steel.

Figure 17:
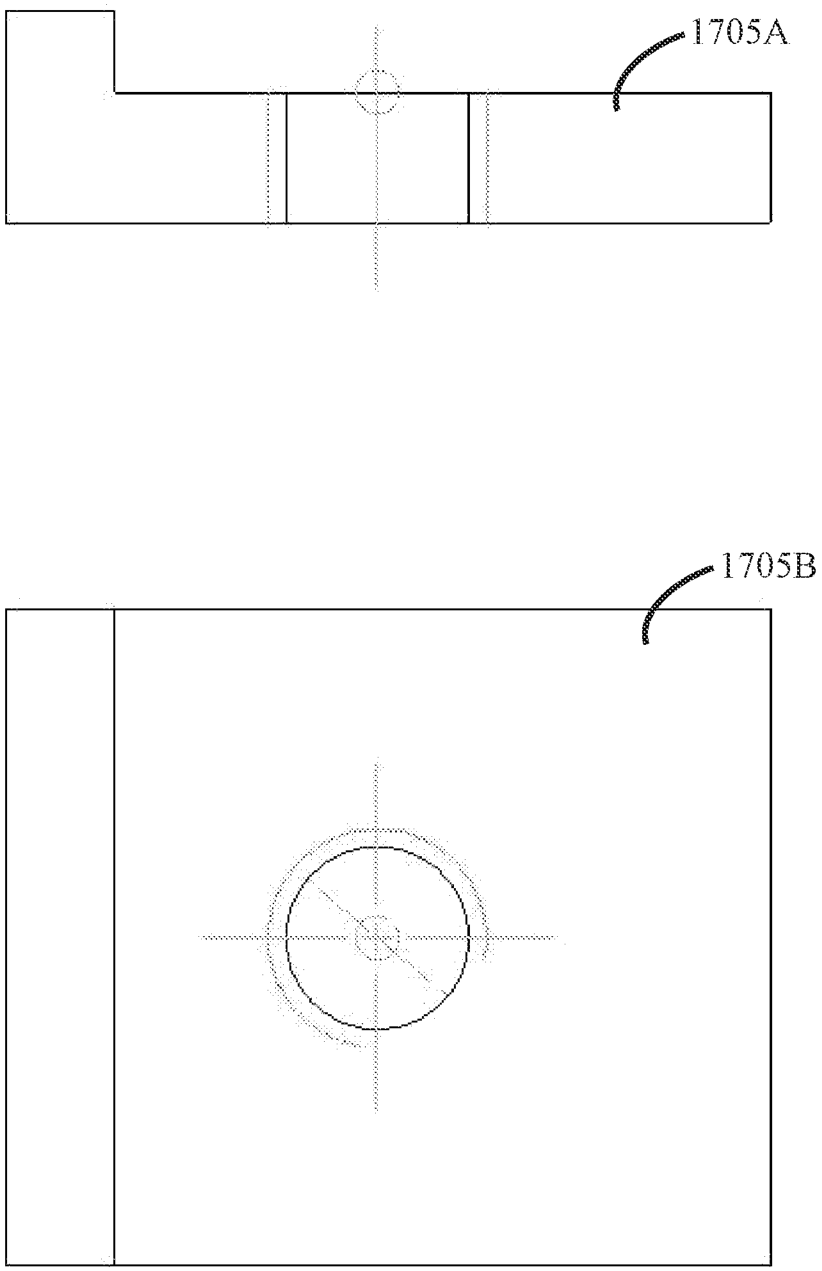
FIG. 17 is an illustration of a fastener support bar of a purlin fastening device in accordance with some embodiments.

FIG. 17 is an illustration of a fastener support bar of a purlin fastening device in accordance with some embodiments. FIG. 17 provides an illustration of fastener support bar 1705B from an overhead perspective and an illustration of fastener support bar 1705A from a side view perspective. The fastener support bar 1705A of a purlin fastening device illustrated in FIG. 17 is enabled to engage a portion of the bottom of a purlin engagement device. The fastener support bar 1705A of a purlin fastening device illustrated in the embodiment shown in FIG. 17 is configured for an edge fastening device capable of engaging two purlin engagement devices. Those of skill in the art will appreciate that fastener support bar 1605A can be constructed of a variety of materials, including metal alloys, aluminum, and steel.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photovoltaic array comprising:

a first photovoltaic module comprising a first photovoltaic module edge including a first purlin engagement device, the first photovoltaic module having a vertical axis extending along a thickness of the first photovoltaic module and horizontal axis extending along the length of the photovoltaic module; and a first purlin;

wherein the first purlin can be removably coupled with the first purlin engagement device of the first photovoltaic module edge of the first photovoltaic module;

wherein the first purlin engagement device is removably coupled with the first purlin by slidably engaging a first lip of the first purlin with a first purlin aperture of the first purlin engagement device;

wherein a long axis of the first lip of the first purlin is substantially parallel to the horizontal axis of the photovoltaic module edge;

wherein the first purlin aperture of the first purlin engagement device has a total surface area and a majority of the total surface area of the first purlin aperture is in contact with the first lip of the first purlin;

wherein a mid tongue and a bottom tongue of the first purlin engagement device comprise tips that are slated at opposite angles providing the first purlin aperture; and wherein the mid tongue is not locally thickened at its opening tip.

2. The photovoltaic array of claim 1, wherein more than 10% of the length of first photovoltaic module edge is in contact with the first purlin when the first purlin engagement device is removably coupled with the first purlin.

3. The photovoltaic array of claim 1, wherein the first purlin aperture is substantially parallel with the first photovoltaic module edge.

4. The photovoltaic array of claim 1, wherein the first purlin engagement device is removably coupled with the first purlin by forcibly clamping the first lip of the first purlin with the first purlin aperture in the first purlin engagement device.

5. The photovoltaic array of claim 1, further comprising a first purlin fastening device;

wherein the first purlin fastening device is configured to fasten the first purlin engagement device with the first purlin.

6. The photovoltaic array of claim 5, the first purlin engagement device further comprising:

the mid tongue above the first purlin aperture and the bottom tongue below the first purlin aperture;

wherein the first purlin fastening device is enabled to compress the mid tongue and the bottom tongue of the first purlin engagement device to fasten the first lip of the first purlin at least partially inside the first purlin aperture.

7. The photovoltaic array of claim 1, further comprising:

the first photovoltaic module comprising a second photovoltaic module edge including a second purlin engagement device; and a second purlin;

wherein the second purlin can be removably coupled with the second purlin engagement device of the second photovoltaic module edge of the first photovoltaic module.

8. The photovoltaic array of claim 7, wherein more than 10% of the length of second photovoltaic module edge is in contact with the second purlin when the second purlin engagement device is removably coupled with the second purlin.

9. The photovoltaic array of claim 7, further comprising:

a second purlin fastening device;

wherein the second purlin fastening device can fasten the second purlin engagement device with the second purlin.

10. The photovoltaic array of claim 9, wherein the second purlin engagement device is removably coupled with the second purlin by slidably engaging a first lip of the second purlin with a second purlin aperture in the second purlin engagement device.

11. The photovoltaic array of claim 9, wherein the second purlin engagement device is removably coupled with the second purlin by forcibly clamping a first lip of the second purlin with a second purlin aperture in the second purlin engagement device.

12. The photovoltaic array of claim 11, the second purlin engagement device further comprising:

a mid tongue above the second purlin aperture and a bottom tongue below the second purlin aperture;

wherein the second purlin fastening device in enabled to compress the mid tongue and the bottom tongue of the second purlin engagement device to fasten the first lip of the second purlin at least partially inside the second purlin aperture.

13. A method for installing a photovoltaic module comprising:

providing a first photovoltaic module having a vertical axis extending along a thickness of the first photovoltaic module and horizontal axis extending along the length of the photovoltaic module, the first photovoltaic module comprising a first photovoltaic module edge comprising a first purlin engagement device including a first purlin aperture;

providing a first racking system comprising a first purlin including a first lip;

connecting the first lip of the first purlin with the first purlin aperture of the first purlin engagement device of the first photovoltaic module; and fastening the first purlin with a first purlin fastening device includes connecting the first lip of the first purlin with the first purlin aperture of the first purlin engagement device of the first photovoltaic module;

wherein a long axis of the first lip of the first purlin is substantially parallel to the horizontal axis of the photovoltaic module edge;

wherein the first purlin aperture of the first purlin engagement device has a total surface area and a majority of the total surface area of the first purlin aperture is in contact with the first lip of the first purlin;

wherein a mid tongue and a bottom tongue of the first purlin engagement device comprise tips that are slated at opposite angles providing the first purlin aperture; and wherein the mid tongue is not locally thickened at its opening tip.

14. The method for installing a photovoltaic module of claim 13, further comprising:

providing a first purlin fastening device; and fastening with the first purlin fastening device the first purlin engagement device with the first purlin.

15. The method for installing a photovoltaic module of claim 14, wherein the first purlin aperture is substantially parallel with the first photovoltaic module edge.

16. The method for installing a photovoltaic module of claim 13, further comprising:

providing a second purlin engagement device with the first photovoltaic module including a second purlin aperture;

providing a second purlin including a first lip with the first racking system; and connecting the first lip of the second purlin with the second purlin aperture of the second purlin engagement device of the first photovoltaic module.

17. The method for installing a photovoltaic module of claim 16, further comprising:

providing a second purlin fastening device; and fastening with the second purlin fastening device the second purlin engagement device with the second purlin.

18. A photovoltaic module comprising:

a first photovoltaic module edge including a first purlin engagement device;

wherein the photovoltaic module has a vertical axis extending along a thickness of the first photovoltaic module and horizontal axis extending along the length of the photovoltaic module, wherein the first purlin engagement device comprises a purlin aperture;

wherein the purlin aperture is configured to receive a first lip of a first purlin;

wherein the horizontal axis of the first photovoltaic module edge is substantially parallel to a long axis of the first lip of the first purlin;

wherein the first purlin aperture of the first purlin engagement device has a total surface area and a majority of the total surface area of the first purlin aperture is in contact with the first lip of the first purlin;

wherein a mid tongue and a bottom tongue of the first purlin engagement device comprise tips that are slated at opposite angles providing the first purlin aperture; and wherein the mid tongue is not locally thickened at its opening tip.

19. The photovoltaic module of claim 18, wherein more than 10% of the length of first photovoltaic module edge is in contact with the first purlin when the first purlin engagement device is removably coupled with the first purlin.

20. The photovoltaic module of claim 18, wherein more than 20% of the length of first photovoltaic module edge is in contact with the first purlin when the first purlin engagement device is removably coupled with the first purlin.

* * * * *